(12) United States Patent
Snoga

(10) Patent No.: US 6,766,855 B2
(45) Date of Patent: Jul. 27, 2004

(54) APPARATUS AND METHOD FOR DETERMINING THE DIP OF AN UNDERGROUND FORMATION IN A CASED OR UNCASED BOREHOLE

(76) Inventor: Ivan Snoga, 15410 Winter Mist, San Antonio, TX (US) 78247

(*) Notice: Subject to any disclaimer, the term of this patent is extended or adjusted under 35 U.S.C. 154(b) by 0 days.

(21) Appl. No.: 10/209,012

(22) Filed: Jul. 31, 2002

(65) Prior Publication Data

US 2004/0020647 A1 Feb. 5, 2004

(51) Int. Cl.[7] ............................................. G01V 5/00
(52) U.S. Cl. .......................... 166/254.1; 116/254.2; 250/262; 250/269.3; 250/269.7
(58) Field of Search ........................ 166/254.1, 254.2; 250/261, 262, 269.2, 269.3, 269.7, 269.8

(56) References Cited

U.S. PATENT DOCUMENTS

| | | | |
|---|---|---|---|
| 2,316,361 A | 4/1943 | Piety | 250/83.6 |
| 2,464,930 A | 3/1949 | Herzog | 250/83.6 |
| 2,725,486 A | 11/1955 | Walstrom | 250/83.6 |
| 2,967,933 A | 1/1961 | Scherbatskov | 250/71.5 |
| 4,503,328 A * | 3/1985 | Neufeld | 250/262 |
| 2003/0085707 A1 * | 5/2003 | Minerbo et al. | 324/343 |

* cited by examiner

Primary Examiner—William Neuder
(74) Attorney, Agent, or Firm—Jackson Walker LLP

(57) ABSTRACT

A well logging system that has, as its goal, the collection of information normally acquired by a dip log tool based on conductivity or resistivity measurements, but with the advantages of radiation based well logging systems. Unlike conductivity based dip log systems, the radiation-based system can be implemented in cased or uncased boreholes. The combination system incorporates a number of radially arrayed devices that, though structurally distinct, function much like the arms associated with conductivity dip log devices. The system incorporates radiation detectors positioned in a radial array rather than electrodes. The combination system measures radiation in each of the multiple radial orientations and responds to generated radiation in the respective directions. The sensitivity of the radiation measuring devices is set so as to localize the region of the borehole being measured. Whereas standard radiation well logging systems are less concerned with localizing the measurement, the present system accurately identifies the orientation of the signal and thus the nature and angle of the formation the signal derives from.

12 Claims, 5 Drawing Sheets

APPARATUS AND METHOD FOR DETERMINING THE DIP OF AN UNDERGROUND FORMATION IN A CASED OR UNCASED BOREHOLE

BACKGROUND OF THE INVENTION

1. Field of the Invention

The present invention relates generally to well logging tools for the acquisition of data in an underground borehole. The present invention relates more specifically to a tool, and a method for using the tool, to determine the dip angle of underground formations traversed by a cased or uncased borehole.

2. Description of the Related Art

The oil and gas industry has devoted much effort to the development of various devices and methods for identifying, recording and analyzing the characteristics of underground formations traversed by boreholes. This information on the characteristics of underground formations is critical to a real time determination of the prospects for locating oil or gas in a drilled location. Extensive studies of geological formations have allowed oil and gas operators to improve the chances of locating and reaching oil and gas bearing formations simply by maintaining accurate information on the composition and structure of the various formations traversed and followed in the process of drilling the borehole.

There are many different well logging techniques and tools available on the market. These tools and techniques generally fall into three or four different categories of investigation. Techniques such as the detection and measurement of resistivity, induction, conductivity, acoustic and electromagnetic field changes to radiation measurements, both active and passive, are utilized in typical well logging systems. These methods seek to identify the nature or composition of the formations surrounding the borehole at any given point, to identify the distance into the borehole that the tool is positioned at, to identify the angle of inclination for the borehole itself, to identify the directional orientation (typically from a reference azimuth or from a magnetic north) of the borehole.

Also of great importance to many well logging techniques, and the primary subject of the present invention, is a determination of the angle at which the underground formations are oriented at the point at which the borehole traverses the formation. This so-called "dip angle" allows the oil and gas operators to not only characterize the nature of the formation surrounding the borehole but additionally to identify the likely direction that the surrounding formations follow or the likely location of other formations of particular interest that are known to be adjacent the referenced formation. Such information has become an aid in determining structure and is particularly relevant to drilling techniques in so called "directional drilling" in angled and horizontal wells where geosteering methods are implemented. This is typically the case in multiwell offshore platforms that necessarily run directional boreholes in order to accommodate a number of wells from a single platform. Rather than working with strictly vertical wells, many current oil and gas explorations incorporate steerable well drilling techniques that allow the oil and gas operators to respond to formation structures and dip angles in a manner that permits a change in the direction of the well drilling, often during the drilling operation.

A "dip log" is the recording of information from which the angle and direction of geological bedding planes may be determined. A dip log device is typically used within an open well borehole without casing primarily because existing techniques rely upon direct contact between the sensors measuring the formation and the borehole wall/surface of the formation. Analysis of the information provided by a dip log device makes possible the identification of reefs, channels and faulting, depth formations around salt domes, and other structural anomalies critical in the analysis of oil field geology.

The standard dip log device has either three or four arms positioned radially about a central cylinder and that extend out to make contact with the borehole wall surface. Attached to each arm is a small flexible rubber pad designed to give good contact with the wall of the borehole. Molded into the face of each pad are several small electrodes that operate in pairs to establish a flow of electrical current in the formation upon contact with the electrodes. The arms track the sides of the borehole as the logging tool moves up or down so that the conductivity or resistivity in each area can be measured. Not only are distinctions made in the conductivity or resistivity according to depth but more specific distinctions are drawn between measurements made by one set of electrodes and those made by a second (or third or fourth) set of electrodes positioned radially distinct from the first. In this manner not only can the depth and "thickness" of the formation be determined but some localized inclination can be measured as well. It is this inclination that can be most useful in geosteering operations and in characterizing an approach to a pay zone formation.

The upper section of a dip log device will typically contain a physical orientation mechanism that continuously establishes the position and directional orientation of the instrument with respect to both the gravitational reference and an azimuthal reference (magnetic north). The dip log is normally run after the other open hole logs have been completed. The instrument is attached to the end of a logging cable (wire line) and is suspended and lowered into the borehole with arms in a closed position (see FIG. 1). Once the device is at the bottom of a hole or at the point where the deepest interval is to be logged, a calibration of the measuring circuits is made. The arms are then extended placing the face of each measuring pad in direct contact with the borehole wall. (The new device of the present invention does not require surface contact with the formation as do all existing devices. Tool centralizers in the present invention keep the tool in a proper position.) A survey is then made of the variations and changes in the resistivity or conductivity characteristics of the surrounding traversed formations as the assembly is drawn upwards through the borehole.

By tracking both the radial orientation and the conductivity trace of each the four sensor bearing arms (or three as the case may be), detailed information about the compositions and inclinations of the formational structures that intersect the borehole can be determined. In general, however, this information is readily available only by utilizing a wire line well logging system, as the types of sensors required are typically too fragile to withstand the measurement while drilling environment.

Radiation based well logging, as an alternative to contact resistivity based systems, generally involves either the measurement of natural radiation from the geologic structures intersecting the borehole, or a responsive measurement made after a radioactive source is lowered into the borehole. In either case, measurements of radiation are made and an interpretation of the various levels of the different types of radiation is used to indicate the nature of the structures immediately adjacent to the well logging device. A gamma ray log is considered primarily a shale-locating log while neutron logs provide information on the lithology and the porosity of the formation, thereby characterizing the hydrogen richness of the adjacent formations.

Radiation logs are generally nondirectional in the sense that no specific orientation within the borehole is determined and only a depth of the formation measurement is associated with the radiation measurement.

Resistivity and conductivity logging, as discussed above, have serious limitations. Resistivity and conductivity logging are, for example, ineffective in metal cased boreholes. Consequently owners of older, depleted wells lack dependable logs run prior to completion and often lack other adequate drilling records These older wells are therefore at a loss to determine at what depth they could tap potential oil producing strata before abandoning their wells. Radioactive well logging, in part, is intended to address this problem.

The equipment necessary for a radiation based well log is relatively straightforward. As with dip log methods described above, logging is completed during the upward trip of a wire line tool in order to maintain tautness and to insure that the entire length of cable is under proper tension. Registration of the radioactivity measurements is generally accomplished at the surface in an instrument truck containing the necessary amplification and recording equipment. Signals within the tool are converted to suitable electrical signal form and are either recorded or transmitted up the wire line for analysis. The signal analysis process identifies deflections along the horizontal axis of a chart that measures the intensity against the depth (into the ground) within the borehole. Two or more radioactivity logging curves may be recorded simultaneously in this manner.

All applicable radiation detectors produce signals that are unsuitable for direct transmission over the hoisting cable, the subsurface equipment necessarily contains some amplifying or signal conversion devices. This in turn requires electrical power for operation that must be supplied through the cable from the surface.

As indicated above gamma ray logging is considered primarily a shale-locating log. It should be recognized that there are two types of gamma log methodologies; a first involves passing natural radiation measurements and a second involves an active induced radiation. Shales and certain evaporates normally emit a higher level of natural gamma radiation than do sandstones and carbonates. This fact implies that low gamma ray counting rates are related to nonshales and high gamma ray counts are related to shales. The amplitude of a gamma ray curve therefore identifies such strata. Neutron logs, as mentioned above, provide information on the lithology and the porosity of the formations. Neutron logs respond to the fundamental formation property of "hydrogen richness." If all the formation's hydrogen is contained in the form of liquids, and if these liquids completely occupy the total pore volume, hydrogen richness is an index to porosity. A high neutron counting rate indicates low absorption, low hydrogen content in the formation and a low porosity value. Similarly, a low neutron-counting rate implies high absorption, high hydrogen content in the formation and a high porosity value. Water and oil are substantially the same in hydrogen content, while gas is considerably lower. Consequently a neutron measurement is often able to distinguish between liquid and gas saturated intervals.

Various attempts have been made in the past for incorporating radiation based well logging into a system for measuring the dip angle of the surrounding formation. U.S. Pat. No. 2,316,361 issued to Piety on Apr. 13, 1943 entitled METHOD AND APPARATUS FOR SURVEYING WELLS describes improvements in radiation based well logging that allows a determination of the depth at which the sensor instrumentation passes from one geological strata to another. Most important in the Piety patent is the ability to determine the angular distribution of the radiation received at the sensor. The invention provides a method and apparatus for determining the "strike" and approximating the dip of a stratum pierced by a single borehole. The "strike" of a formation is defined as the horizontal direction of a formation bed as measured at right angles to the dip of the bed. The method is based on the difference in the radioactivity of the adjacent strata. The Piety invention achieves this function by combining a determination of the depth of the sensor with the ability to distinguish from which angular direction the sensor is measuring the radiation. The device described utilizes a magnetic compass orientation to determine the angular position of the sensor in the hole. Such a magnetic orientation device would not be functional in typical cased boreholes.

U.S. Pat. No. 2,464,930 issued to Herzog on Mar. 22, 1949 entitled METHOD AND APPARATUS FOR DETERMINING THE INCLINATION OF SUBSTRATA describes a system for providing an effective way of measuring the angle of inclination of formation within a borehole that may be either cased or uncased by providing a radiation source that is lowered into the borehole and utilizing a number of radiation detectors that discriminate the angle from which the radiation is received back. In the preferred embodiment of the Herzog design, three detectors that have radiation shields such that they receive and detect radiation coming from a 120 degree sector opposite the detector. The patent also discusses the use of a magnetic compass or a gyroscopic orientation device.

U.S. Pat. No. 2,725,486 issued to Walstrom on Nov. 29, 1955 entitled METHOD AND APPARATUS FOR WELL LOGGING utilizes a number of radioactive sources that track the interior borehole wall much as do the arms of a standard dip log device. The patent discloses in the first section the shortcomings of electrical resistivity based calipering methods that utilize the well known wall engaging arms through mechanical linkages. The patent instead provides a radiation detector isolated from contact with the borehole walls and the fluids contained in it and a number of radioactive sources, each of which is movable by the wall engaging arms. Although an important objective of the Walstrom invention is to provide a means for determining changes in the diameter of the borehole, a second form of the device is identified as being particularly useful in determining the dip of strata transversed by the well bore. The radiation detecting means includes an individual detector for each of the plurality of radioactive sensors.

U.S. Pat. No. 2,967,933 issued to Scherbatskoy on Jan. 10, 1961 entitled DIP DETERMINATION describes a method and apparatus for measuring the inclination or a dip of a formation or stratum that is transversed by a borehole. The device is intended to be utilized in a borehole that is either cased or uncased and functions by providing a source of neutrons with a number of detectors that can radially detect differences in the reaction of the formation to the neutron bombardment. As indicated in Column 1 of the patent, when the housing is placed in the hole opposite the boundary between adjacent sloping formations which react different to neutron bombardment, the response of each crystal detector will depend upon the nature of the formation which is opposite that detector, and from the simultaneous record which is made from the outputs of these detectors, the amount of inclination of the formation can be ascertained. The Scherbatskoy invention anticipates the combination of three or four detectors; each assigned to receive radiation readings from a specific radial portion of the well borehole wall. The patent also describes the use of gyroscopic orientation devices for determining the angular position of the instrumentation.

The problems associated with each of the above-referenced patents involve both the structure of the gamma ray detection devices and their ability to function in narrower cased boreholes and the use of chemical based radiation sources which have universal safety concerns that dramatically increase the cost of the operation. None of the above referenced patent disclosed devices are known to have been developed into workable systems. This is likely due to ineffective source outputs, and the random scatter of low and high energy levels of the neutrons, also hole riggosity affecting the shallow depth of investigation of the referenced devices.

SUMMARY OF THE INVENTION

The new well logging system of the present invention has, as its goal, the collection of information normally acquired by a dip log system based on conductivity or resistivity measurements as indicated and described above, but with the advantages of a radiation based well logging system. Unlike conductivity or resistivity based dip log systems, the radiation-based system can be implemented in cased or uncased boreholes. The combination system incorporates a number of radially arrayed devices much like the arms associated with conductivity or resistivity dip log devices, but with radiation detectors positioned in the radial array rather than electrodes. The combination system could then measure natural radiation in each of the multiple radial orientations as well as induced radiation in the respective directions. Generally speaking the sensitivity of the radiation measuring devices would be set so as to localize the region of the borehole being measured. Whereas standard radiation well logging systems are less concerned with localizing the measurement, the present system would require localization in order to accurately identify the orientation of the signal.

The radiation-based dip log system of the present invention, therefore, includes most if not all of the ancillary components associated with conductivity or resistivity based dip log devices. Differences in the depth at which certain strata are detected by the radiation logging devices characterize the dip and the strike just as conductivity or resistivity based devices would. Again, the advantages are associated with the single pass capability and the ability to proceed in cased boreholes.

Additionally, the present invention utilizes a radiation source that is passive in nature. There are essentially two types of radiation sources generally categorized as chemical and nonchemical sources. A chemical source comprises a radioactive compound contained within the tool that emits radiation when the material is exposed to the formation. Such chemical based radiation tools are inherently dangerous at the surface (as with during calibration) in that levels of radiation can be quite high. Nonchemical sources generate radioactivity only upon activation of the tool once it is within the borehole. These sources typically operate by utilizing high voltage particle generators or accelerators in place of the radioactive material. In this manner little or no radiation is emitted by the device until activation occurs within the borehole.

In summary, the present invention utilizes a radioactive particle generating device as a source of particles for radiation based well logging and a radially oriented array of radiation detectors for gathering information on the formation characteristics surrounding the borehole (cased or uncased) and associating not only a depth measurement with the information but also a borehole orientation measurement.

DESCRIPTION OF THE PREFERRED EMBODIMENTS

Figure 1:
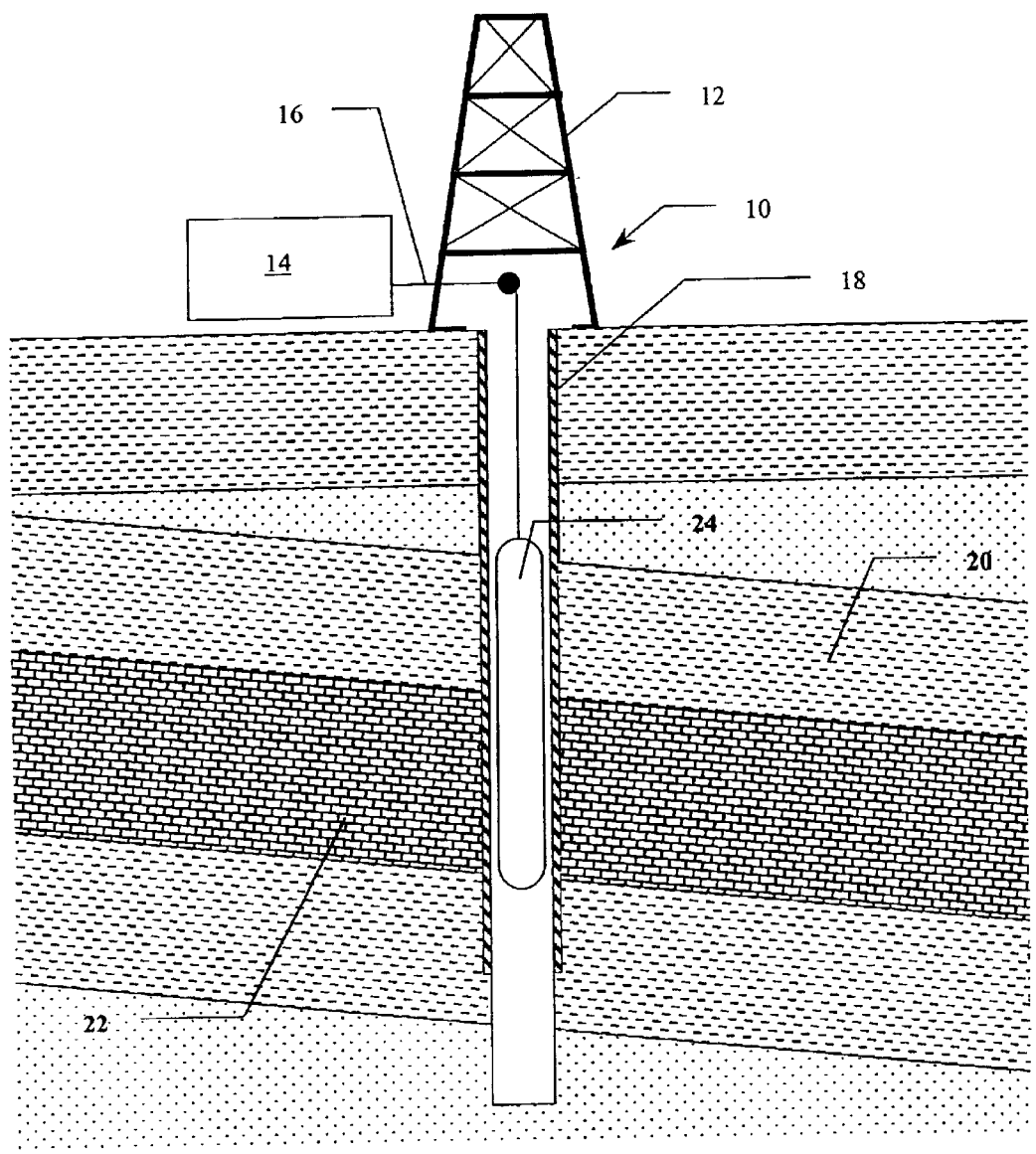
FIG. 1 is a schematic diagram showing the overall application and arrangement of the tool of the present invention.

Reference is made first to FIG. 1 for a brief description of the borehole environment within which the system of the present invention is intended to operate. In FIG. 1, borehole 10 is shown traversing a plurality of underground formations including formation 20 and formation 22. At the surface, well derrick 12 is positioned over borehole 10 and is associated with surface instrumentation 14. In the typical wire line logging method and system, wire line 16 is used to suspend the logging tool string 24 as shown. Various linear distance tracking devices and the like as are well known in the art may be implemented in conjunction with the placement of logging tool string 24 into borehole 10.

In this particular environment, borehole 10 is lined on all sides by borehole casing 18 in a manner well known in the art. While the present invention may function in both cased and uncased boreholes, it is its ability to function in a cased borehole that distinguishes it and allows it to solve problems heretofore unaddressed. The primary objective of the system of the present invention is not only to identify formations that traverse borehole 10, but also to identify the inclination or dip angle of formations such as those associated with formation 22 shown in FIG. 1. The combination of knowledge about the type of formation and the angle of the formation would, for example, permit a characterization of the underground formations such that formations to the side of the borehole, not specifically traversed by the borehole, might be identified As an example, the angles of formation 22 and formation 20 shown in FIG. 1 could permit an oil and gas operator to identify formations to one side or the other that would result from the combined angles of the formation layers as shown.

Figure 2:
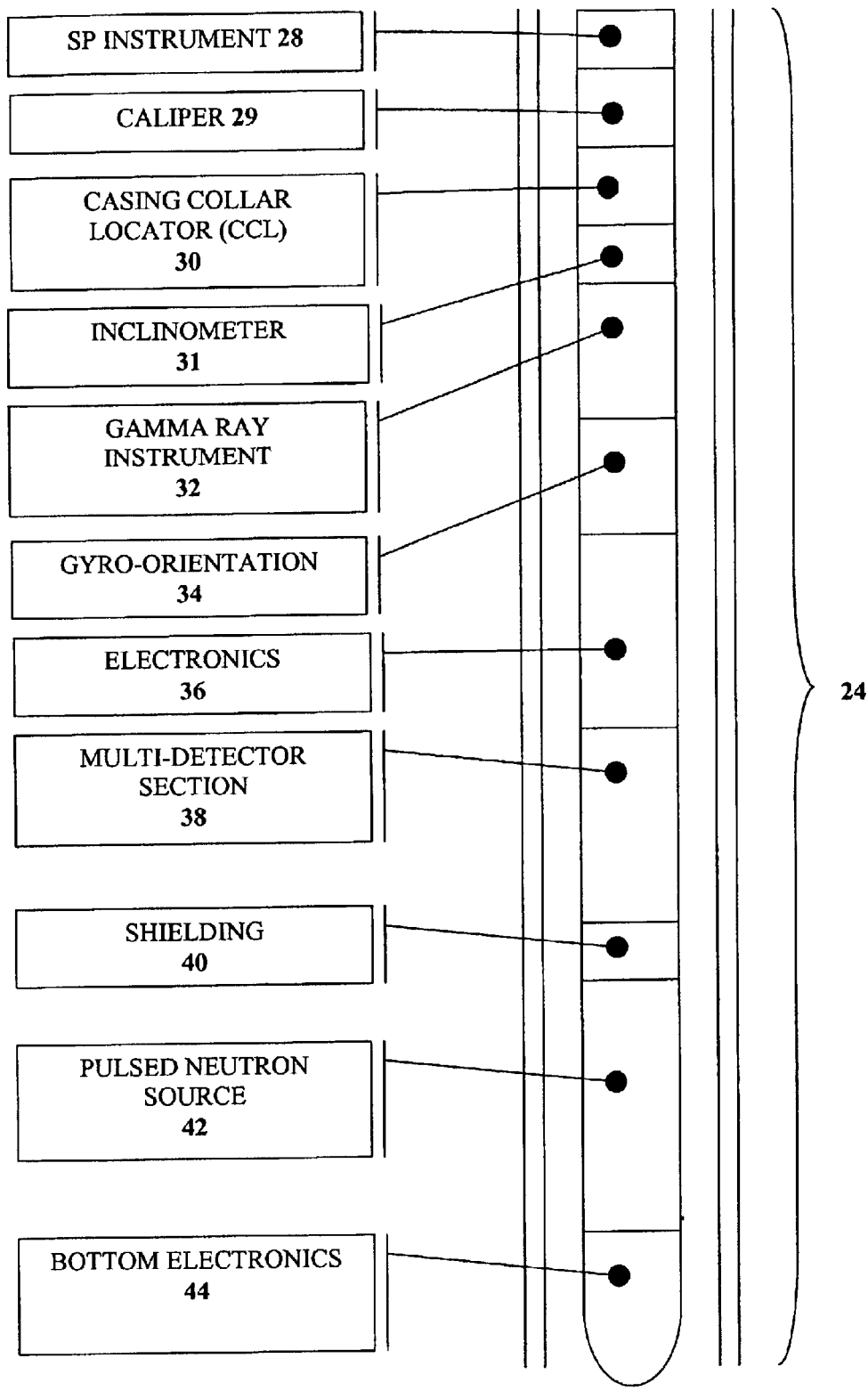
FIG. 2 is a detailed schematic diagram showing the various components of the overall well logging tool of the present invention.

Reference is now made to FIG. 2 for a detailed description of the specific elements and components found in logging tool string 24 shown generally in FIG. 1. FIG. 2 is a schematic diagram not intended to represent the actual geometry of the devices and components present in tool string 24 but rather to identify and suggest their functional relationship and their relative position in the tool string. The most important component identified in tool string 24 is pulsed neutron source 42. This radiation based logging system generates a pulsed sequence of high-energy neutrons. Measurement using such a system is based on the fact that high-energy neutrons emitted by a source are captured by material around the source. The thermal neutron capture cross-section sigma ($\Sigma$) is a basic physical parameter of the formation that depends upon the chemical make-up of the rocks and on the amount and type of fluid in the porous space within the rocks. Sigma ($\Sigma$) can be determined by observing thermal neutron decay in the rock following from a burst of neutrons from the pulsed neutron generator 42. The method of logging is generally designed to measure gamma radiation produced by the thermal neutron capture reactions during selected intervals when the neutrons are not being emitted by a source. For this reason the neutron generator 42 is switched on and off electronically emitting neutrons in brief and intense uniform repetitive pulses. In between the pulses neutron induced gamma radiation is measured. The decay of the neutrons in the formation may be identified by a similar decay of the neutron captured gamma ray intensity measured by the detectors during the discreet time intervals or gates. The pulsed neutron source in the preferred embodiment operates at a rate of approximately one kilohertz and emits 14 MeV neutrons in the time interval identified. The manner in which the gamma rays are detected is described in more detail below.

Also seen in FIG. 2 are the less critical but still important components of the complete logging system of the present invention. Bottom tool electronics 44 provide the necessary control circuits and data acquisition circuits for not only generating the appropriate radiation but also receiving the appropriate signal data back and preparing it for transmission to the surface. Shielding 40 is provided to separate the pulsed neutron source 42 and its associated electronics 44 from the balance of the logging tool.

Multidetector section 38 and its associated electronics 36 are present to provide a variety of additional types of well log information as may be appropriate under the circumstances. These additional well logs may be any of a number of well-known formation or orientation sensitive systems.

Gyro-orientation section 34 is provided to coordinate the formation data with specific tool orientation data. Since the radiation based dip log device described herein depends upon knowledge of not only the linear displacement of the tool within the borehole, but also the rotational orientation of the tool. The gyro-orientation section 34 provides one part of the radial orientation information. Gamma ray instrument 32, as with multi-detector section 38, provides additional formation information according to methods well known in the art. Casing collar locator (CCL) 30 is provided near the top of tool section 24 in order to associate a linear distance into the hole for the tool string during the logging operation. Inclinometer 31 is provided as a means for measuring deviation of the borehole from the vertical and may be any of a number of such devices well known in the art. Caliper 29 is provided as a means for measuring borehole diameter and rigosity in open holes. Finally, SP electrode 28 is provided as a means for measuring the spontaneous potential recorded in an open hole. Caliper 29 and SP electrode 28 may be any of a number of such devices well known in the art.

Figure 3:
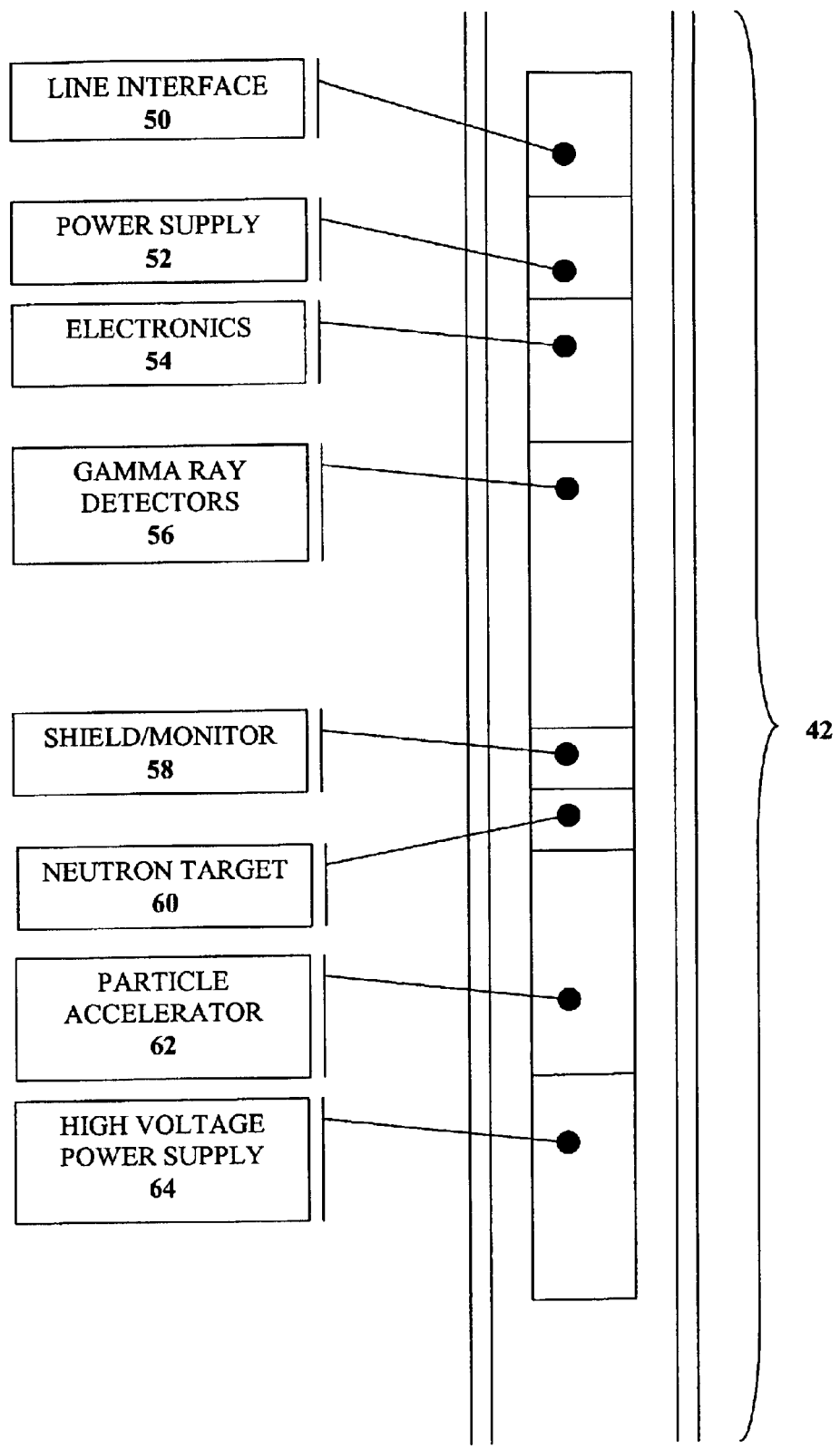
FIG. 3 is a more detailed schematic diagram showing the various elements of the neutron source and radiation detector component of the system of the present invention.

FIG. 3 disclosed in greater detail the structure of pulsed neutron source 42 that forms the primary logging component of the present invention. Pulsed neutron source 42, as indicated above, contains no chemical radiation source but rather generates high energy neutrons through the bombardment of subatomic particles against a target. Shown in FIG. 3 is particle accelerator 62 associated with neutron target 60. Particle accelerator 62 receives its high voltage power from high voltage power supply 64. The entire high voltage system is isolated from the balance of the pulsed neutron source component of the tool by shield/monitor 58.

Thus shielded from particle accelerator 62, gamma ray detector section 56 provides the necessary sensor information associated with the returned gamma rays from the surrounding formation. Electronics 54 provides the necessary data acquisition circuitry for gamma ray detectors 56. Power supply 52 supports the low voltage electronic components of the tool. Line interface 50 provides the necessary circuitry for preparing and transmitting the collected data to the surface through the wire line communication system.

Figure 4A:
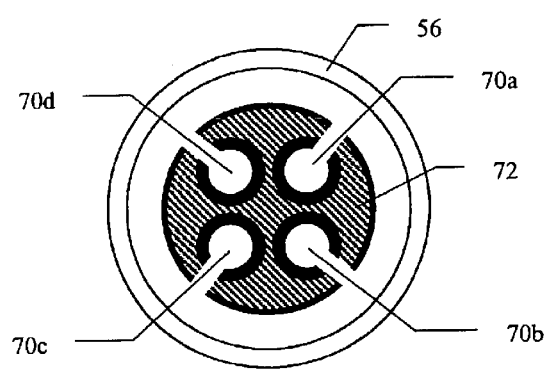
FIGS. 4a–4d are detailed drawings of the gamma ray detection components of the system of the present invention.
Figure 4C:
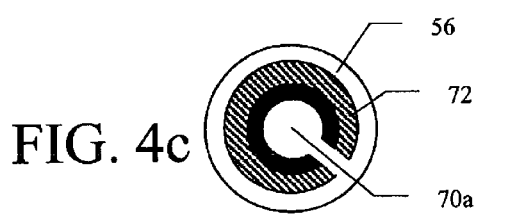
Figure 4B:
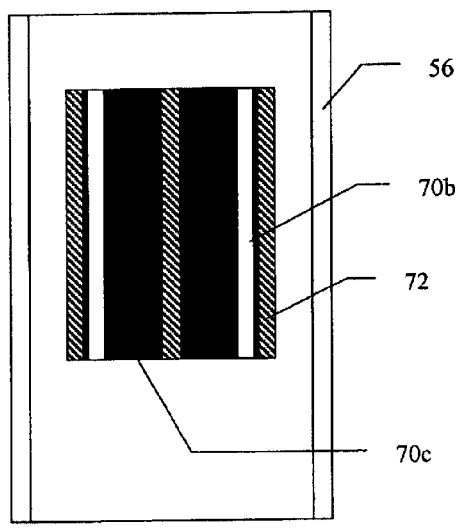

Reference is now made to FIGS. 4a through 4d for detailed descriptions of two alternative embodiments for the gamma ray detector described generally in FIG. 3. FIGS. 4a and 4b show an arrangement for the gamma ray detectors appropriate for use in a larger diameter cased borehole. In this configuration gamma ray scintillation tubes 70a through 70d are radially arranged in the same transverse plane within gamma ray detector 56. These scintillation tubes are themselves oriented and positioned within shielding material 72 so that they "look out" in orthogonal directions. In this manner, the detection of gamma radiation by scintillation tube 70b will not necessarily result in a similar detection by scintillation detector 70c. A degree of directional functionality is therefore provided by this configuration.

Figure 4D:
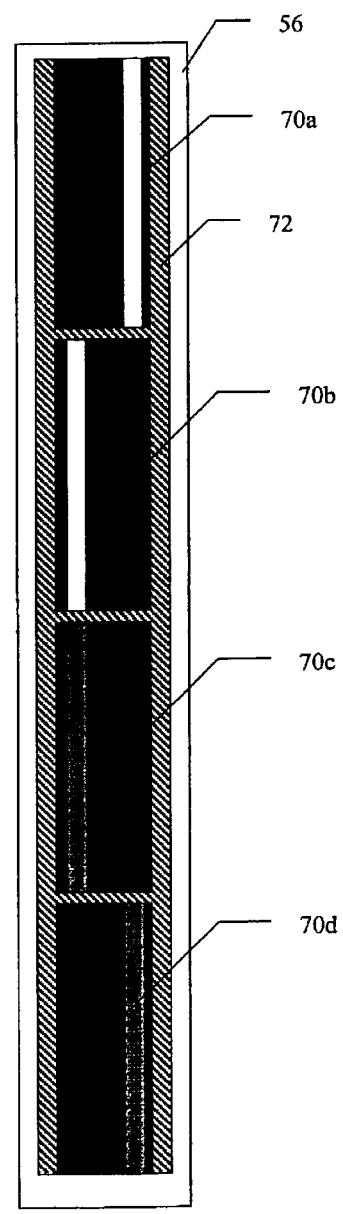

An alternative configuration is disclosed in FIGS. 4c and 4d wherein the same four scintillation tubes 70a through 70d are stacked rather than radially arranged and are structured so as to be capable of logging through tubing (small diameter bores). In FIG. 4d scintillation tubes 70a, 70b, 70c and 70d are shown positioned coaxilly within gamma ray detector section 56. It is understood that in this orientation appropriate windows within and through shielding material 72 for the detectors would be necessary in order to lend directionality to the sensors. Such windows are shown in schematic form in FIGS. 4c and 4d.

Figure 5:
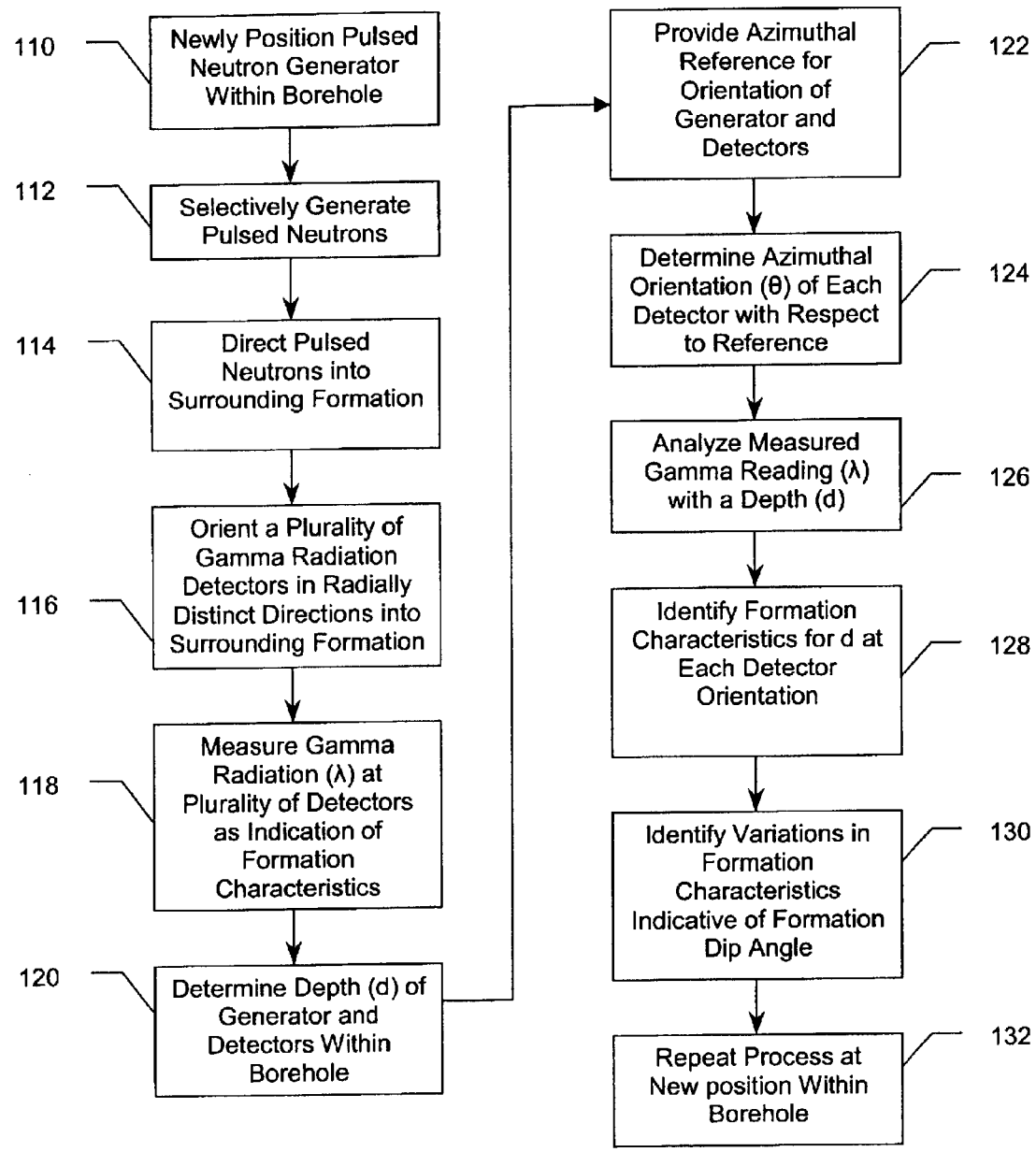
FIG. 5 is a flowchart showing the steps in the method of operation for the present invention.

Reference is now made to FIG. 5 for a description of a preferred method of practicing the present invention. Using the apparatus of the invention the first step 110 involves positioning the tool in the desired location within the borehole. As indicated above, one of the advantages of the present invention is that when not activated the pulsed neutron source does not exhibit harmful radiation. Step 110 therefore may be carried out without concern for stray radiation and without altering the formation response until measurements are desired.

Once positioned in the borehole adjacent a formation to be characterized, the pulsed neutron generator is activated at step 112 so as to selectively generate pulsed neutrons. The selectivity is important to the extent that the tool will likely be carrying out formation measurements in a continuous, progressive manner. The ability to quickly activate and deactivate the generator is therefore important to accurate measurements. Step 114 involves directing the pulsed neutrons into the formation surrounding the borehole.

Step 116 in practice is carried out at the same time as step 110 wherein the positioning of the plurality of gamma radiation detectors in radially distinct directions into the surrounding formation is accomplished with the positioning of the generator that, in the preferred embodiment, is in a fixed relationship with the detectors. Step 118 then follows wherein measurements of the gamma radiation $\lambda$ at the plurality of detectors is carried out. These measurements indicate the resistivity or conductivity characteristics of the formation and therefore serve to distinguish the formation from adjacent, possibly inclined formations.

At step 120 in the process, a record is made of the depth d of the generator/detector array within the borehole. Further, at step 122, the method requires that an azimuthal reference for rotational orientation be established. This reference is necessary because in many instances contrasting formation characteristics on opposite sides of the borehole will evidence the inclination of dip of a surrounding formation. Once the reference has been established at step 122, a determination of the azimuthal orientation θ of each detector is made at step 124. Finally a correlation is made between each gamma measurement λ and the associated depth d and azimuth θ at step 126.

From the data collected and correlated, information about the formation at a specific location and borehole orientation can be made at step 128. Step 130 then involves identifying within the data formation characteristic variations that are indicative of the formation dip angle. Typically this involves identifying changes in the conductivity or resistivity of the formation in a specific direction and recognizing different encounters on an opposite side of the borehole. The difference in the depth at which these formation changes occur (across the borehole) give the inclination of the strata. Those skilled in the art will recognize the need to take into account the inclination of the borehole itself from the vertical in order to establish an accurate characterization of the inclination of the strata. Once such measurements and analysis for a specific depth in the borehole are made it is appropriate, at step 132, to repeat the process at a new position in the borehole by returning to step 110 and repeating the process as needed to identify the necessary strata and the dip angle associated with those strata as they intersect the borehole.

Although the present invention has been described in conjunction with certain preferred embodiments and certain specific applications, it is anticipate that those skilled in the art will discern further embodiments and applications that fall within the scope of the invention. While certain types of well logging methods are described herein, in order to obtain specific information about the borehole, those skilled in the art will recognize substitute well logging methods that acquire the same or similar information about the borehole formations. An understanding of the scope of the invention covering these various alternative embodiments is identified with more specific detail in the following appended claims.

I claim:

1. An apparatus for determining the dip of an underground formation traversed by a cased or uncased borehole, said apparatus comprising:

a housing adapted to be lowered and raised within said hole;

means for generating pulsed neutrons into said underground formation, said generating means comprising a non-chemical based neutron source selectable to generate neutrons or remain non-radioactive, said generating means fixedly positioned within said housing with respect to said housing;

a plurality of directional detectors for measurement of a quantity of gamma radiation induced by said neutrons received at said apparatus from a specific direction within said underground formation in response to said pulsed neutrons, said detectors fixedly positioned within said housing with respect to said housing;

means for determining a depth to which said housing is lowered into said borehole;

means for determining an azimuthal orientation of said housing within said borehole with respect to a radial orientation reference; and means for correlating a measured gamma reading with a specific depth within said borehole and a specific azimuth of said housing;

wherein said correlated gamma reading is indicative of a characteristic of said underground formation at a specific depth within said borehole and at a specific azimuthal orientation for said housing and wherein a comparison of a plurality of said gamma measurements made in sequence facilitate a determination of changes in said underground formation and an angle of said formation as a result of said measurements.

2. The apparatus of claim 1 further comprising means for determining a diameter measurement of said cased or uncased borehole.

3. The apparatus of claim 1 wherein said means for determining said azimuthal orientation of said housing within said borehole comprises an orthogonal gyroscopic compass array referenced to a known azimuthal orientation at a surface location.

4. The apparatus of claim 1 wherein said plurality of directional detectors comprises four detectors oriented in a radial spacing of approximately 90 degrees and said means for generating pulsed neutrons comprises an omni-directional source.

5. The apparatus of claim 1 wherein said means for generating pulsed neutrons is oriented in an equilateral radial arrangement, and said plurality of detectors comprises an array of detectors which by reference to said means for determining an azimuthal orientation within said borehole permit an identification of an azimuthal orientation of said gamma radiation detected by said detector.

6. An apparatus for determining the dip of an underground formation traversed by a cased or uncased borehole, said apparatus comprising:

a housing adapted to be lowered and raised within said hole;

means for generating pulsed neutrons into said underground formation, said generating means comprising a non-chemical based neutron source selectable to generate neutrons or remain non-radioactive, said generating means positioned within said housing and comprising an omni-directional source;

a plurality of directional detectors for measurement of a quantity of gamma radiation received at said apparatus from a specific direction within said underground formation in response to said pulsed neutrons, said detectors positioned within said housing and comprising four detectors oriented in a radial spacing of approximately 90 degrees;

means for determining a diameter measurement of said cased or uncased borehole;

means for determining a depth to which said housing is lowered into said borehole;

means for determining an azimuthal orientation of said housing within said borehole with respect to a radial orientation reference comprising an orthogonal gyroscopic compass array referenced to a known azimuthal orientation at a surface location; and means for correlating a measured gamma reading with a specific depth within said borehole and a specific azimuth of said housing;

wherein said correlated gamma reading is indicative of a characteristic of said underground formation at a specific depth within said borehole and at a specific azimuthal orientation for said housing and wherein a comparison of a plurality of said gamma measurements made in sequence facilitate a determination of changes in said underground formation and an angle of said formation as a result of said measurements.

7. A method for determining the dip angle of a stratified underground formation, said method comprising the steps of:

generating pulsed neutrons with a non-chemical based neutron source selectable to generate neutrons or remain non-radioactive, said generating means positioned within a housing capable of being lowered or raised within said borehole;

detecting a quantity of gamma radiation received at a plurality of detectors from a specific direction within said underground formation in response to said pulsed neutrons, said detectors being positioned within said housing;

determining a depth to which said housing is lowered into said borehole;

determining an azimuthal orientation of said housing within said borehole with respect to a radial orientation reference;

correlating a measured gamma reading with a specific depth within said borehole and a specific azimuth of said housing;

identifying a characteristic of said underground formation at a specific depth within said borehole and at a specific azimuthal orientation for said housing; and comparing a plurality of said gamma measurements made in sequence and determining changes in said underground formation and an angle of said formation as a result of said measurements.

8. The method of claim 7 further comprising the step of determining a diameter measurement of said cased or uncased borehole and compensating said gamma radiation measurements for effects caused by passage of said pulsed neutrons and said gamma radiation through said borehole volume.

9. The method of claim 7 wherein said step of determining said azimuthal orientation of said housing within said borehole comprises providing an orthogonal gyroscopic compass array referenced to a known azimuthal orientation at a surface location and tracking a plurality of motions of said housing as said housing is lowered and raised within said borehole.

10. The method of claim 7 wherein said of detecting said gamma radiation comprises providing four detectors oriented in a radial spacing of approximately 90 degrees and detecting said radiation from each of said orientations and said step of generating pulsed neutrons comprises providing an omni-directional pulsed neutron source.

11. The method of claim 7 wherein said step of generating pulsed neutrons comprises orienting said pulsed neutron source in an equilateral radial arrangement, and said step of detecting said gamma radiation comprises providing a plurality of detectors in an array referenced to said determined azimuthal orientation within said borehole and further comprising the step of identifying an azimuthal orientation of said gamma radiation detected thereby.

12. A method for determining the dip angle of a stratified underground formation, said method comprising the steps of:

generating pulsed neutrons with a non-chemical based neutron source selectable to generate neutrons or remain non-radioactive, said generating means positioned within a housing capable of being lowered or raised within said borehole and comprising providing an omni-directional pulsed neutron source;

detecting a quantity of gamma radiation received at a plurality of detectors from a specific direction within said underground formation in response to said pulsed neutrons, said detectors being positioned within said housing and comprising four detectors oriented in a radial spacing of approximately 90 degrees, and detecting said radiation from each of said orientations;

determining a depth to which said housing is lowered into said borehole;

determining an azimuthal orientation of said housing within said borehole with respect to a radial orientation reference comprising providing an orthogonal gyroscopic compass array referenced to a known azimuthal orientation at a surface location and tracking a plurality of motions of said housing as said housing is lowered and raised within said borehole;

determining a diameter measurement of said cased or uncased borehole and compensating said gamma radiation measurements for effects caused by passage of said pulsed neutrons and said gamma radiation through said borehole volume;

correlating a measured gamma reading with a specific depth within said borehole and a specific azimuth of said housing;

identifying a characteristic of said underground formation at a specific depth within said borehole and at a specific azimuthal orientation for said housing; and comparing a plurality of said gamma measurements made in sequence and determining changes in said underground formation and an angle of said formation as a result of said measurements.

* * * * *